Feb. 12, 1935.   D. GREGG   1,990,866
ICE OVERSHOE FOR AIRCRAFT
Original Filed Jan. 2, 1932   3 Sheets-Sheet 1
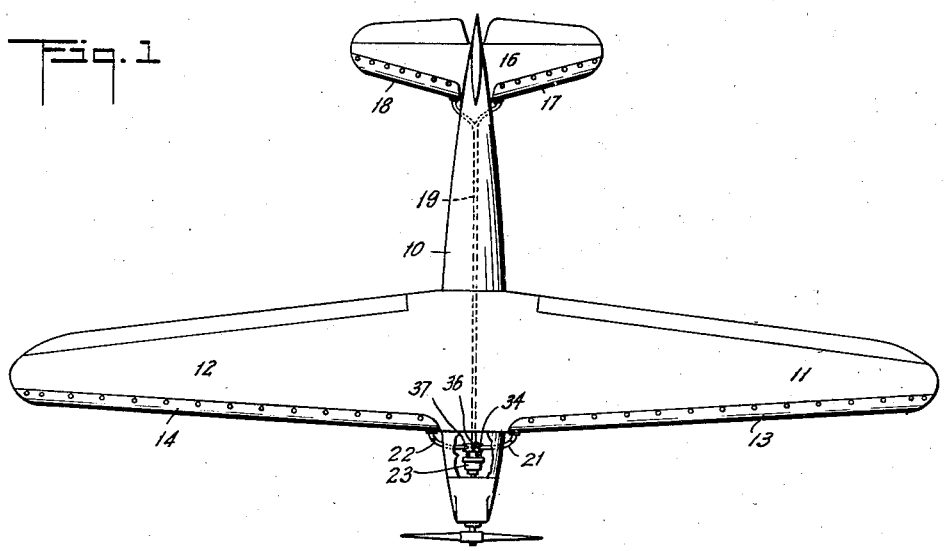
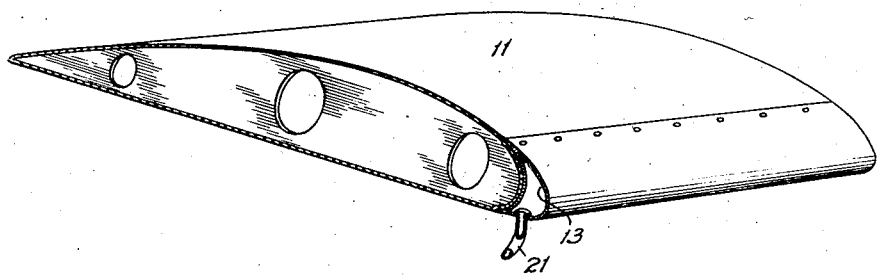
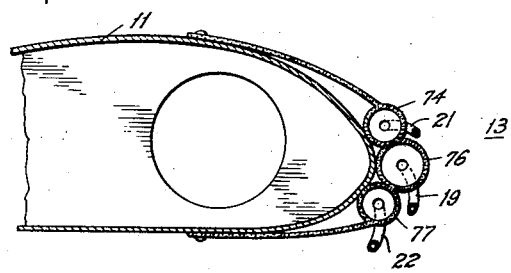
INVENTOR.
David Gregg
BY
Warren P. Hunt
ATTORNEY.

Feb. 12, 1935.  D. GREGG  1,990,866
ICE OVERSHOE FOR AIRCRAFT
Original Filed Jan. 2, 1932  3 Sheets-Sheet 2
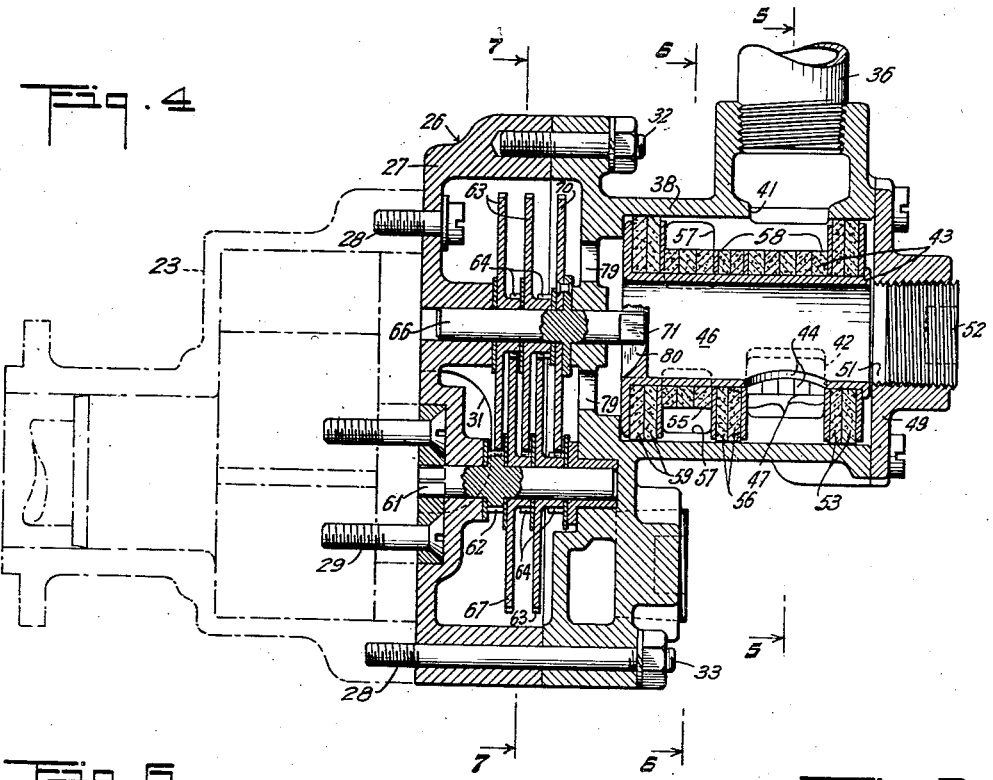
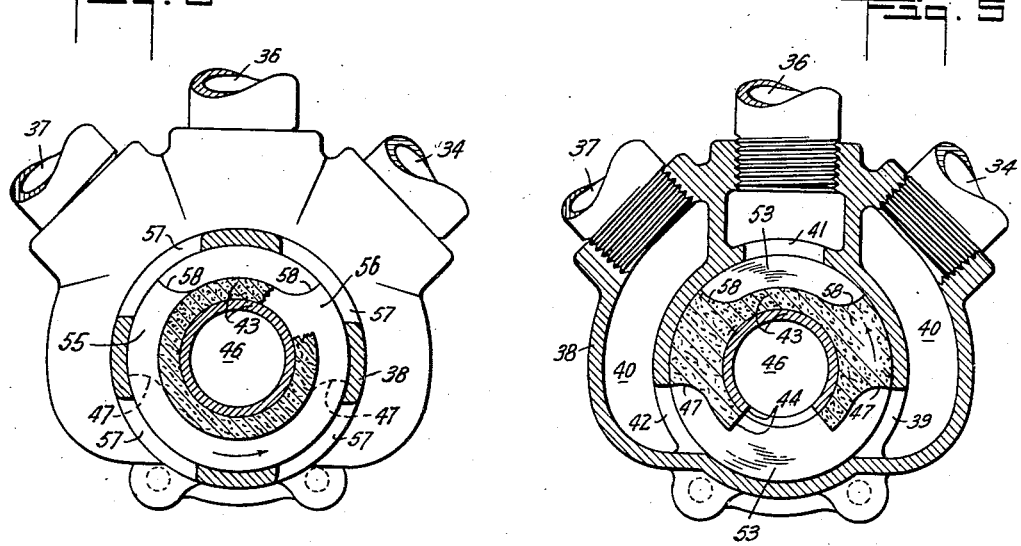
INVENTOR
David Gregg
BY
Warren T. Hunt
ATTORNEY Feb. 12, 1935.   D. GREGG   1,990,866
ICE OVERSHOE FOR AIRCRAFT
Original Filed Jan. 2, 1932   3 Sheets-Sheet 3

INVENTOR
David Gregg
BY
Warren T. Hunt
ATTORNEY

Patented Feb. 12, 1935

1,990,866

UNITED STATES PATENT OFFICE 1,990,866

ICE OVERSHOE FOR AIRCRAFT

David Gregg, Caldwell, N. J., assignor, by mesne assignments, to Eclipse Aviation Corporation, East Orange, N. J., a corporation of New Jersey Application January 2, 1932, Serial No. 584,495
Renewed November 15, 1933

36 Claims. (Cl. 244—31)

This invention relates to airplanes, and more particularly to a means and method for preventing the accumulation of ice on airplanes, particularly on the wing and tail structures.

It is well known that under certain conditions of temperature and relative humidity, ice will form on the structural parts of an airplane. This formation is cumulative and at times seriously interferes with the control and operation of the plane. The more common locations for the ice formation are the leading edges of the wings and tail structure, and one of the objects of this invention is to provide a flexible and expansible member or ice overshoe at these points, and to expand and contract the members periodically by any suitable means, such as pneumatic pressure.

Another object of the invention is to provide an airplane with ice overshoes that are periodically expanded and contracted at regular intervals and in a regular sequence whereby the ice formation is broken up before it has built up to a dangerous point.

Another object of the invention is to provide an airplane with a plurality of ice overshoes of the pneumatic type which are regularly expanded and contracted by a common source of pressure.

Another object of the invention is to provide an airplane with a plurality of inflatable ice overshoes that are positively connected and disconnected from a source of pressure in regular cycles of operation.

Another object of the invention is to provide an improved control for a plurality of pneumatically actuated ice overshoes whereby the pressure content of the shoes is routed from one to the other for conserving the air supply and permitting the use of a comparatively small pump.

Another object of the invention is to provide a pneumatic ice overshoe system in which one shoe is partially inflated by the exhaust of another shoe.

Another object of the invention is to provide a pneumatic ice overshoe system in which each of the shoes is inflated in two stages, one stage being an indirect inflation and the other a direct inflation.

Another object of the invention is to provide an improved distributor valve for an ice overshoe system whereby the air is routed through two or more shoes prior to its exhaust into the atmosphere.

Other objects of the invention will be apparent from the following description, in connection with which a preferred embodiment of the invention has been illustrated in the accompanying drawings, in which:

Fig. 1 is a top plan view of an airplane provided with the improved ice overshoe system;

Fig. 2 is an enlarged perspective view of a portion of the wing structure illustrating the installation of the overshoe and its supply pipe;

Fig. 3 is a slightly different form of the invention showing an ice overshoe having three compartments;

Fig. 4 is an axial sectional view of the distributor used in connection with the improved system;

Fig. 5 is a transverse sectional view taken on the line 5—5 of Fig. 4;

Fig. 6 is a transverse sectional view taken on the line 6—6 of Fig. 4;

Figure 7:
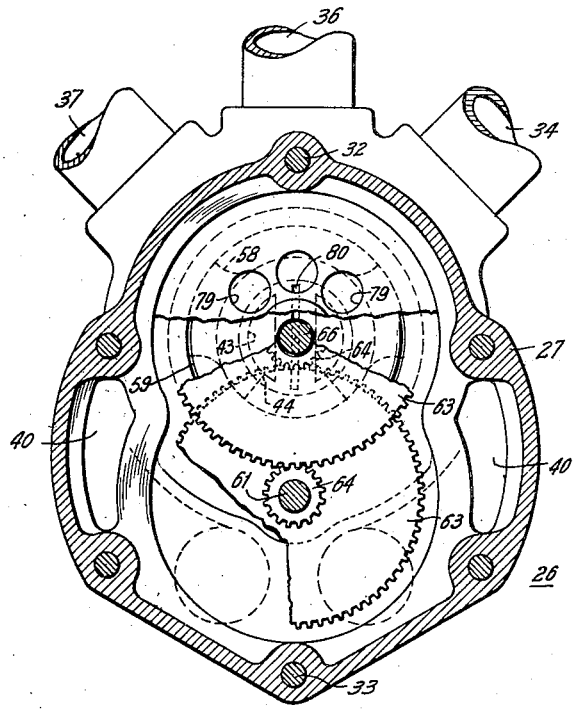
Fig. 7 is a transverse sectional view taken on the line 7—7 of Fig. 4.
Figure 8:
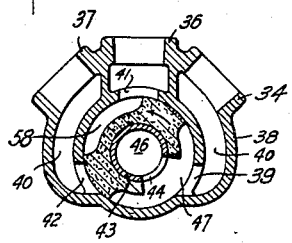
Figure 9:
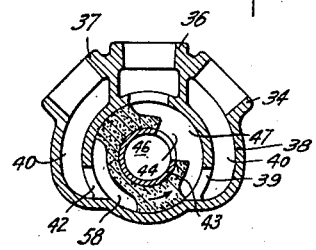
Figure 11:
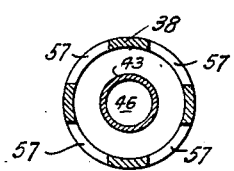
Figure 10:
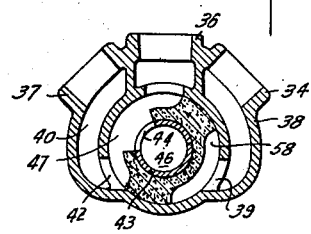

Figs. 8, 9, and 10 are similar views on a reduced scale showing the distributor rotor in three different positions; and, Fig. 11 is a view similar to Fig. 6 illustrating a portion of the distributor housing with the distributor elements removed.

In the drawings, 10 is an airplane having wings 11 and 12 provided with ice overshoes 13 and 14 and a tail structure 16, the leading edges of which are provided with similar ice overshoes 17 and 18. Each of the shoes used may be provided with a separate pipe, but in the form illustrated, a distributor having three outlets, 34, 36 and 37, is used and, therefore, shoes 17 and 18 have been combined and are fed from a single pipe 19, while shoes 13 and 14 are supplied by pipes 21 and 22 respectively.

Each overshoe is expanded and contracted in a recurring cycle at intervals, for example, of one minute, although any other timing arrangement may be used if desired. The air supply is preferably derived from an engine driven pump 23 of any desired type, such as the eccentric vane type designated by the broken lines in Fig. 4. The pump is preferably provided with a distributor, generally designated at 26, having a housing 27 adapted to be secured to the pump housing by any desired means, such as bolts 28 and 29, and having the interior of the housing in communication with the pressure side of pump 23 by a port 31. Housing 27 is preferably formed in two portions secured together by bolts 32 and 33, the outer portion of which forms the outlet of the pump by means of supply pipes 34, 36, and 37, each one of which is adapted to be connected to an overshoe that is to be inflated. Pipes 34, 36 and 37 are in communication with the interior of the distributor housing 38, which has cored passages 40 having ports 39, 41 and 42 respectively that are located in the same plane and preferably equally spaced about the periphery of the housing.

The distributor rotor 43 is provided with a port 44 in communication with a cylindrical passage 46 at the interior of the rotor, from which the air from the pump 23 is delivered to each of the ports 39, 41 and 42 in regular order by means of a cut-away portion 47 which is shown in Fig. 5 as being of sufficient width to bridge two of the ports. The outer end of distributor casing 38 is provided with a cap 49 having an opening 51 closed by a removable plug 52 and which opening may be connected to a regulating valve (not shown) for permitting the discharge to pass direct to the atmosphere and render the pump inoperative. The entire outer end of the distributor 43 is preferably sealed by washers 53, which may be of cork or other suitable material for preventing leaks between the rotor and the housing, while at the opposite side of the cut-away portion 47 is another set of cork washers 56 which are adapted to seal the portion 47 from the distributor housing and to provide a closed passage whereby the air is directed to the outlet ports 39, 41 and 42. Housing 38, intermediate its ends, is provided with a plurality of ports 57 that are at all times in communication with the atmosphere and at least one of which is in communication with a cut-away portion 58 of the distributor that is formed on the side opposite to outlet passage 47 and forms a discharge passage whereby the air from each overshoe is exhausted to the atmosphere upon alignment of cut-away port 58 with the separate ports 39, 41 and 42. The inner end of distributor 43 is preferably sealed with washers 59 which are quite similar to washers 53 and form the outer closures of the exhaust cut-away portion 58 which includes the annular chamber 55, as best shown in Figs. 4 and 6. Distributor 43 is preferably driven at low speed, and the means used in the present embodiment comprises a train of gears similar to that used in a clock mechanism, whereby the driving shaft 61 may be driven at pump speed and the rotor 43 driven at a very much reduced speed.

In the form illustrated in Fig. 4, drive shaft 61 is provided with a pinion 62 which is formed integral or otherwise secured to the shaft and in mesh with a gear 63 having a pinion 64 secured thereto. Gear 63 is loosely mounted on shaft 22, whereby pinion 64 meshes with a second gear 67 loosely mounted on shaft 61 which, in turn, drives other similar gears and pinions forming a train terminating with gear 70 secured to shaft 66, having a driving connection at 71 with the distributor valve 43.

In the form illustrated in Fig. 3, each individual shoe may be formed of three compartments that are inflated and deflated in succession in the same manner as the individual shoes of Fig. 1, and in this form of the invention the three outlets of the pump are connected to the individual compartments 74, 76, and 77 respectively, or to any desired grouping of these compartments among the several ice overshoes.

In the operation of the improved ice overshoe system, pump 24 delivers air under pressure to the distributor housing 27 through ports 31, from which it is led through the gear compartment and openings 79 into the interior of distributor rotor 43, by way of passages formed at each side of the connecting means 80 between shaft 66 and said rotor.

In the position of the rotor, as illustrated in Fig. 8, the ice overshoe supplied by pipe 34 will be directly inflated by the pump for reason that port 39 is in communication with passage 46. Pipe 36 is connected to the atmosphere through the exhaust passage 58 which, as before stated, is in communication with ports 57 in the distributor casing 38 and the overshoe connected with 37 is isolated from both the pump and the atmosphere.

If the rotor be turned in a counter-clockwise direction, to the position shown in Fig. 9, outlets 34 and 36 are bridged by the cut-away portion 47, and the shoe connected with outlet 34 will exhaust into the shoe connected with outlet 36 and permit the pressure in these shoes to be equalized. The shoe corresponding to outlet 37 is being deflated, for it is connected to the atmosphere through cut-away portion 58.

Upon further rotation, to the position shown in Fig. 10, the shoe corresponding to outlet 34 is being deflated and the shoe corresponding to outlet 36 is exhausting into the shoe corresponding to outlet 37. It will be readily understood that this cycle of operation is continuous and that each of the shoes in succession will be inflated directly from the pump, subsequently exhaust half of its contents into another shoe, and then exhaust the remaining contents into the atmosphere.

It is obvious that in the above system of operation, half of the air supplied by the pump is used again for inflating another overshoe and that the pump need be only one-half the capacity of that needed in a system in which each individual shoe is inflated directly from the pump and deflated by discharging directly into the atmosphere.

While a preferred embodiment of the system has been illustrated and described, it is understood that this showing and description are illustrative only and that the invention is not regarded as limited to the form shown and described, or otherwise, except by the terms of the following claims.

What is claimed is:

1. In combination with an airplane, a source of pressure, a plurality of expansible members secured to the plane structure, and means for periodically connecting the members with the source of pressure and each other.

2. In combination with an airplane, a source of pressure, a plurality of expansible members secured to the plane structure, and means including a distributor valve for periodically connecting the members with the source of pressure and each other.

3. In combination with an airplane, a source of pressure, a plurality of expansible members secured to the airplane, means for connecting the members with the source of pressure to expand the same, means for connecting the members with each other, and means for connecting the members with the atmosphere to exhaust the same.

4. In combination with an airplane, a source of pressure, a plurality of expansible members secured to the airplane, a mechanically operated valve for connecting the members with the source of pressure to expand the same, and said valve being adapted to connect the members with each other and thereafter with the atmosphere to exhaust the same.

5. In combination with an airplane, expansible members mounted thereon, a pump, a distributor housing having ports for connecting the pump to the members, and means including a rotary distributor valve having a relieved portion of sufficient width to bridge two adjacent ports for periodically connecting and disconnecting the pump and members and for connecting and disconnecting adjacent ports.

6. In combination with an airplane, expansible members mounted thereon, a pump, a distributor housing having equidistant ports for connecting the pump to the members, means including a rotary distributor valve having a relieved portion of sufficient width to bridge two of the ports for periodically connecting and disconnecting the pump and members, and for connecting and disconnecting adjacent ports, and a reduction gear mechanism connecting the valve with the pump.

7. In combination with an airplane, a plurality of expansible members mounted thereon, a source of pressure, means for periodically connecting one member with the source of pressure, said means being movable to operatively connect the first mentioned member with a second expansible member, and said means being movable a further amount to operatively connect the first member with the atmosphere to deflate the same.

8. In combination with an airplane, a plurality of expansible members mounted thereon, a source of pressure, a rotary distributor valve for periodically connecting a member with the source of pressure, said valve being movable to operatively connect the first mentioned member with a second expansible member, and said valve being movable a further amount to operatively connect the first member with the atmosphere to deflate the same.

9. In combination with an airplane, a plurality of ice overshoes therefor, a pump, means including a distributor valve for periodically connecting and disconnecting the pump and overshoes, said distributor valve having a casing with a port for each shoe or group of shoes, a rotor in the distributor having a port of sufficient width to bridge two casing ports for equalizing the pressure in the corresponding shoes, and said rotor having a second port adapted to periodically connect said casing ports with the atmosphere.

10. In combination with an airplane, a plurality of ice overshoes therefor, a pump, means including a distributor valve for periodically connecting and disconnecting the pump and overshoes, said distributor valve having a casing with a port for each shoe, a rotor in the distributor having a port of sufficient width to bridge two casing ports for equalizing the pressure in the corresponding shoes, and said rotor having a second port adapted to periodically connect said casing ports with the atmosphere, said second distributor port being arranged to connect one of said casing ports to atmosphere subsequent to the equalization of the pressure between the said casing ports.

11. The method of operating a plurality of pneumatic ice overshoes which comprises inflating one shoe, subsequently conveying pressure from the inflated shoe to a deflated shoe, discontinuing the inflation of the first shoe, then deflating the first shoe, and thereafter deflating the second shoe.

12. The method of operating a plurality of pneumatic ice overshoes which comprises inflating one shoe, subsequently conveying pressure from the inflated shoe to a deflated shoe, discontinuing the inflation of the first shoe, continuing the inflation of the second shoe, deflating the first shoe, and thereafter deflating the second shoe.

13. The method of operating three or more ice overshoes which comprises the cycle of inflating one shoe, partially inflating a second shoe from the first shoe, discontinuing the inflation of the first shoe, continuing the inflation of the second shoe, deflating the first shoe, partially inflating a third shoe from the second shoe, discontinuing the inflation of the second shoe, deflating the second shoe, and continuing the cycle of operation for all shoes in the order set forth.

14. The method of operating a plurality of ice overshoes which comprises inflating one shoe, partially deflating the shoe in a manner to partially inflate another shoe, and subsequently completely deflating the first shoe.

15. The method of operating a plurality of ice overshoes which comprises completely inflating one shoe, partially deflating the shoe in a manner to partially inflate another shoe, subsequently completely deflating the first shoe, and consecutively continuing said deflation and inflation of all shoes in recurring cycles.

16. In an airplane, an ice overshoe having a plurality of inflatable compartments, a pump, and means for inflating and deflating said compartment, said means including a valve for utilizing the pressure of one compartment to partially inflate another compartment.

17. In a device for inflating airplane ice overshoes and the like, a pump having a rotor, a housing therefor, a distributor valve rotatably mounted in said housing and driven by said rotor, said housing having a plurality of outlet passages from the distributor, said rotor having means therein adapted to connect said passages to the pump and to each other in sequence as the rotor is actuated, and means for connecting each of said passages in sequence to the atmosphere as the rotor is actuated.

18. In a device for inflating airplane ice overshoes and the like, a pump having a rotor, a housing therefor, a distributor valve rotatably mounted in said housing and driven by said rotor, said housing having a plurality of outlet passages from the distributor, said rotor having means including a central passage adapted to connect said passages to the pump and to each other in sequence as the rotor is actuated, and said rotor having an external passage for connecting each of said passages in sequence to the atmosphere as the rotor is actuated.

19. In a device for inflating airplane ice overshoes or the like, a pump having a rotor and a housing, a distributor valve in the housing, means for driving said valve by said pump, said housing having outlets from said distributor to said overshoes, said housing having passages therein for conducting fluid from the pump to the distributor, and said distributor having a central passage in communication with the housing, and said distributor having means including a port adapted to connect the housing outlets with the interior of the distributor.

20. In a device for inflating airplane ice overshoes or the like, a housing having equally spaced outlet passages in the same plane, a rotor in the housing having a central passage, said rotor having a port adapted to connect the outlet passages with the central passage as the rotor is moved, said port being of sufficient width to simultaneously connect two of the outlet passages with the central passage and with each other, and means for supplying fluid pressure to the central passage.

21. In an airplane, an expansible member secured to the plane having a plurality of inflatable compartments, means for inflating one compartment, means for equalizing the pressure between the inflated compartment and a second compartment, and means for deflating the first compartment.

22. In an airplane, an expansible member secured to the plane having a plurality of inflatable compartments, means for inflating one compartment, means for equalizing the pressure between the inflated compartment and a second compartment, means for deflating the first compartment, and means for further inflating the second compartment.

23. In an airplane, a source of pressure, an expansible member secured to the plane having a series of separated compartments, and means for connecting the compartments with the source of pressure and with each other and with the atmosphere in recurring cycles.

24. In an airplane, a source of pressure, an expansible member secured to the plane having a series of separated compartments, and power driven means for connecting the compartments with the source of pressure and with each other and with the atmosphere in recurring cycles.

25. In an airplane, an expansible member secured to the plane, means for expanding the member in separate pressure stages, and means for deflating the member in separate pressure stages.

26. In an airplane, an expansible member secured to the plane, means operable in a recurring cycle for expanding the member in separate pressure stages and for deflating the member in separate pressure stages, said expanding stages comprising an inflation to substantially one-half pressure and a subsequent inflation to full pressure.

27. In an airplane, an expansible member secured to the plane, a fluid pressure pump, a second expansible member adapted to store fluid pressure from the pump, and means for alternately connecting the first member to the second member and to the pump.

28. In an airplane, an expansible member secured to the plane, a fluid pressure pump, a second expansible member adapted to store fluid pressure from the pump, and means for consecutively connecting the first member to the second member and to the pump and thereafter to the atmosphere in recurring cycles.

29. In an airplane, a plurality of expansible members secured to the plane, a source of pressure, means operative in a recurring cycle for connecting the members to the source of pressure in sequence, to each other in sequence and to the atmosphere in sequence.

30. The method of inflating an ice overshoe having a plurality of sections, which comprises inflating one section by external pressure, connecting the first section to a second section to partially inflate the same, and subsequently continuing the inflation of the second section by external pressure.

31. The method of inflating an ice overshoe having a plurality of expansible sections, which comprises storing pressure in one section, connecting the first section to a second section to partially inflate the same, subsequently continuing the inflation of the second section, partially deflating the second section into a third section, and exhausting the remaining pressure to atmosphere.

32. In an airplane, an ice overshoe having a plurality of individually expansible members, means operable in a recurring cycle including a distributor valve for expanding, connecting and deflating the members in sequence, said members being inflated and deflated in pressure stages, and said distributor valve being adapted to connect a fully inflated member with a fully deflated member for obtaining a partial deflation of one member and a partial inflation of the other.

33. In an airplane, an ice overshoe having a plurality of individual expansible members, means including a rotary distributor valve and a pump for expanding and deflating the members in sequence, said members being inflated in pressure stages, said distributor valve being adapted to connect a fully inflated member with a fully deflated member for obtaining partial inflation of one member and a partial deflation of the other member, and said distributor valve being arranged to connect the partially inflated member with the pump upon further rotation of the valve.

34. In an airplane, an ice overshoe having a plurality of individual expansible members, means including a rotary distributor valve and a pump for expanding and deflating the members in sequence, said members being inflated in pressure stages, said distributor valve being adapted to connect a fully inflated member with a fully deflated member for obtaining partial inflation of one member and a partial deflation of the other member, and said distributor valve being arranged to simultaneously connect the partially inflated member with the pump and the fully inflated member upon further rotation of the valve.

35. In combination with an airplane, a source of pressure, at least three expansible members secured to the plane structure, and means for periodically connecting two members with the source of pressure and with each other and the third member with the atmosphere at the same time, and said means being operative to connect each member to the pump and to another member and to the atmosphere in sequence.

36. In combination with an airplane, a plurality of expansible members secured to the plane structure, fluid pressure means for inflating the members in a recurring cycle, and means for utilizing the same fluid in sequence for inflating the members.

DAVID GREGG.